United States Patent
Nishimaki (10) Patent No.: US 11,450,238 B2
(45) Date of Patent: Sep. 20, 2022

(54) CONVERSION KEY GENERATION APPARATUS, ENCRYPTED TEXT CONVERSION APPARATUS, DECRYPTION APPARATUS, ENCRYPTED TEXT CONVERSION SYSTEM, CONVERSION KEY GENERATION METHOD, ENCRYPTED TEXT CONVERSION METHOD, DECRYPTION METHOD, AND PROGRAM

(71) Applicant: NIPPON TELEGRAPH AND TELEPHONE CORPORATION, Tokyo (JP)

(72) Inventor: Ryo Nishimaki, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 65 days.

(21) Appl. No.: 16/972,191

(22) PCT Filed: Apr. 25, 2019

(86) PCT No.: PCT/JP2019/017785
§ 371 (c)(1),
(2) Date: Dec. 4, 2020

(87) PCT Pub. No.: WO2019/235102
PCT Pub. Date: Dec. 12, 2019

(65) Prior Publication Data
US 2021/0233431 A1    Jul. 29, 2021

(30) Foreign Application Priority Data
Jun. 8, 2018    (JP) .............................. JP2018-110561

(51) Int. Cl.
*G09C 1/00*    (2006.01)
*H04L 9/06*    (2006.01)
(Continued)

(52) U.S. Cl.
CPC .............. *G09C 1/00* (2013.01); *H04L 9/0618* (2013.01); *H04L 9/085* (2013.01); *H04L 9/0861* (2013.01); *H04L 9/30* (2013.01)

(58) Field of Classification Search
CPC ......... G09C 1/00; H04L 9/0618; H04L 9/085; H04L 9/0861; H04L 9/30
See application file for complete search history.

(56) References Cited

U.S. PATENT DOCUMENTS

2015/0016606 A1*  1/2015  Omino ................... H04L 9/0869
                                                    380/46
2015/0043735 A1*  2/2015  Fujii ........................ H04L 9/14
                                                    380/277
(Continued)

FOREIGN PATENT DOCUMENTS

JP         2012-220834        11/2012

OTHER PUBLICATIONS

Matt Blaze et al., "Divertible Protocols and Atomic Proxy Cryptography", In Kaisa Nyberg, editor, Eurocrypt' 98, vol. 1403, 1998, pp. 127-144.
(Continued)

*Primary Examiner* — Darshan I Dhruv
(74) *Attorney, Agent, or Firm* — IPUSA, PLLC (57) ABSTRACT

A transformation key generation apparatus has key generation means for receiving a decryption key sks of a first public key encryption scheme $\Sigma s$ and a public key pkd of a second public key encryption scheme $\Sigma d$, and generating a transformation key utks→d for transforming first ciphertext cts of the first public key encryption scheme $\Sigma s$ into second ciphertext tct of the second public key encryption scheme $\Sigma d$ by using a probabilistic circuit or function secret sharing.

4 Claims, 6 Drawing Sheets

(51) Int. Cl.
*H04L 9/08* (2006.01)
*H04L 9/30* (2006.01)

(56) References Cited

U.S. PATENT DOCUMENTS

| | | | | |
|---|---|---|---|---|
| 2015/0372812 | A1* | 12/2015 | Parann-Nissany | H04L 63/06 |
| | | | | 380/44 |
| 2015/0378627 | A1* | 12/2015 | Kitazawa | G06F 21/6209 |
| | | | | 711/162 |
| 2016/0254914 | A1* | 9/2016 | Saito | H04L 9/3242 |
| | | | | 713/153 |
| 2017/0099263 | A1* | 4/2017 | Matsuzaki | G06F 16/9535 |
| 2017/0366338 | A1* | 12/2017 | Gajek | H04L 9/008 |
| 2017/0366519 | A1* | 12/2017 | Rao | H04L 9/008 |
| 2018/0131512 | A1* | 5/2018 | Gajek | H04L 9/3073 |
| 2020/0344049 | A1* | 10/2020 | Yasuda | H04L 9/14 |

OTHER PUBLICATIONS

Giuseppe Ateniese et al., "Improved Proxy Re-Encryption Schemes with Applications to Secure Distributed Storage", The Internet Society, Feb. 2005.
Ran Canetti and Susan Hohenberger, "Chosen-Ciphertext Secure Proxy Re-Encryption", ACM Press, Oct. 23, 2007, pp. 185-194.

* cited by examiner

CONVERSION KEY GENERATION APPARATUS, ENCRYPTED TEXT CONVERSION APPARATUS, DECRYPTION APPARATUS, ENCRYPTED TEXT CONVERSION SYSTEM, CONVERSION KEY GENERATION METHOD, ENCRYPTED TEXT CONVERSION METHOD, DECRYPTION METHOD, AND PROGRAM

TECHNICAL FIELD

The present invention relates to a transformation key generation apparatus, a ciphertext transformation apparatus, a decryption apparatus, a ciphertext transformation system, a transformation key generation method, a ciphertext transformation method, a decryption method, and a program.

BACKGROUND ART

As a technique for transforming ciphertext of a given scheme into ciphertext of another scheme without transforming the ciphertext of the given scheme into plaintext, a technique called ciphertext transformation is known. As the scheme of such ciphertext transformation, many proxy re-encryption schemes have been proposed conventionally (e.g., NPLs 1 to 3).

CITATION LIST

Non Patent Literature

[NPL 1] Matt Blaze, Gerrit Bleumer, and Martin Strauss. Divertible protocols and atomic proxy cryptography. In Kaisa Nyberg, editor, EUROCRYPT '98, volume 1403 of LNCS, pages 127-144. Springer, Heidelberg, May/June 1998.
[NPL 2] Giuseppe Ateniese, Kevin Fu, Matthew Green, and Susan Hohenberger. Improved proxy re-encryption schemes with applications to secure distributed storage. In NDSS 2005. The Internet Society, February 2005.
[NPL 3] Ran Canetti and Susan Hohenberger. Chosen-ciphertext secure proxy re-encryption. In Peng Ning, Sabrina De Capitani di Vimercati, and Paul F. Syverson, editors, ACM CCS 07, pages 185-194. ACM Press, October 2007.

SUMMARY OF THE INVENTION

Technical Problem

However, in the conventional ciphertext transformation scheme, only ciphertext in a format specified by the scheme can be transformed. In contrast to this, in the case where it is desired to transform ciphertext of a given encryption scheme into ciphertext of another encryption scheme, it is possible to design proxy re-encryption for these encryption schemes from scratch, but it takes time to design the proxy re-encryption and introduction cost for actual use is increased.

In addition, in the conventional ciphertext transformation scheme, it is not possible to transform ciphertext of an existing public key encryption scheme (i.e., ciphertext of a normal public key encryption scheme which is not the proxy re-encryption) into ciphertext of another public key encryption scheme universally.

The present invention is achieved in view of the above points, and an object thereof is to transform ciphertext of any public key encryption scheme into ciphertext of another public key encryption scheme.

Means for Solving the Problem

In order to attain the above object, a transformation key generation apparatus of the present invention includes key generation means for receiving a decryption key $sk_s$ of a first public key encryption scheme $\Sigma_s$ and a public key $pk_d$ of a second public key encryption scheme $\Sigma_d$, and generating a transformation key $utk_{s \to d}$ for transforming first ciphertext $ct_s$ of the first public key encryption scheme $\Sigma_s$ into second ciphertext tct of the second public key encryption scheme $\Sigma_d$ by using a probabilistic circuit or function secret sharing.

In addition, a ciphertext transformation apparatus of the present invention includes transformation means for receiving a transformation key $utk_{s \to d}$ for transforming first ciphertext $ct_s$ of a first public key encryption scheme $\Sigma_s$ into second ciphertext tct of a second public key encryption scheme $\Sigma_d$ and the first ciphertext $ct_s$, and transforming the first ciphertext $ct_s$ into the second ciphertext tct by using a probabilistic circuit or function secret sharing.

Further, a decryption apparatus of the present invention includes decryption means for receiving second ciphertext tct obtained by transforming first ciphertext $ct_s$ of a first public key encryption scheme $\Sigma_s$ with a transformation key $utk_{s \to d}$ and a decryption key $sk_d$ of a second public key encryption scheme $\Sigma_d$, and outputting a message m obtained by decrypting the second ciphertext tct with the decryption key $sk_d$.

Effects of the Invention

According to the present invention, it is possible to transform the ciphertext of any public key encryption scheme into the ciphertext of another public key encryption scheme.

DESCRIPTION OF EMBODIMENTS

Hereinbelow, embodiments (a first embodiment and a second embodiment) of the present invention will be described. In each embodiment of the present invention, a description will be given of a ciphertext transformation system 1 which transforms cipher of any public key encryption scheme into ciphertext of another public key encryption scheme. By such a ciphertext transformation system 1, it is possible to transform ciphertext of a given public key encryption scheme which is currently used into ciphertext of another public key encryption scheme, and hence, for example, it is possible to save the trouble of designing proxy re-encryption and also reduce introduction cost for actual use.

<Preparation>

First, before description of the present invention, several terms will be described.

Function Secret Sharing (FSS)

Hereinafter, function secret sharing (FSS) will be described. The notation of signs and the like is based on Reference Documents 1 and 2 shown below. Note that signs and the like written in cursive script are written in block letters for convenience sake. In addition, hereinafter, a description is limited to an additive reconstruction method. Note that, for details of the function secret sharing, please refer to, e.g., Reference Document 1 and Reference Document 2 shown below.

[Reference Document 1] Elette Boyle, Niv Gilboa, and Yuval Ishai. Function secret sharing.

[Reference Document 2] Elette Boyle, Niv Gilboa, and Yuval Ishai. Breaking the circuit size barrier for secure computation under DDH. In Matthew Robshaw and Jonathan Katz, editors, CRYPTO 2016, Part I, volume 9814 of LNCS, pages 509-539. Springer, Heidelberg, August 2016.

A function is expressed as the set (class) F of a bit string f. Each set specifies an efficient evaluation algorithm Eval having an input length n and an output length m. Herein, Eval(f, x) is an algorithm which calculates an output value to an input x of f.

At this point, m-party function secret sharing for the function class F consists of two algorithms (Gen, Eval).

Herein, $Gen(1^\lambda, f)$ is a key generation algorithm, and receives a security parameter $1^\lambda$ and the description of a function $f \in F$ and outputs m keys $(k_1, \ldots, k_m)$. Suppose that each key includes descriptions of an input domain $D_f$ and an output domain $R_f$.

In addition, $Eval(i, k_i, x)$ is the evaluation algorithm, and receives an index $i \in [m]$, a key $k_i$, and $x \in \{0, 1\}^n$ and outputs $y_i$. Herein, $y_i$ is $f_i(x)$ indicative of the i-th split value of $f(x)$.

Next, secure (m, t)-$\delta$-FSS for the function class F satisfies (1-1) $\delta$-correctness and (1-2) confidentiality shown below.

(1-1) $\delta$-Correctness: For all $f \in F$ and $x \in D_f$, $$Pr\left[\sum_{i=1}^{m} Eval(i, k_i, x) = f(x) \mid (k_1, \ldots, k_m) \leftarrow Gen(1^\lambda, f)\right] > 1 - \delta - negl(\lambda)$$ [Formula 1]

is established.

(1-2) Confidentiality: Experiment Between Challenger and Attacker A $$Expt_A^{fss}(1^\lambda, b)$$ [Formula 2]

is defined by using Step 1 to Step 5 described below.

Step 1: A challenger sends a security parameter $1^\lambda$ to an attacker A.

Step 2: The attacker A sends descriptions of functions $f_0$ and $f_1 \in F$ which satisfy $$D_{f_0} = D_{f_1},$$ [Formula 3]

and the set $S \subset [m]$ having a size of no more than t to the challenger.

Step 3: The challenger calculates $(k_i, \ldots, k_m) \leftarrow Gen(1^\lambda, f_b)$, and sets $v := \{k_i\}_{i \in S}$.

Step S4: The challenger gives v to the attacker A.

Step 5: The attacker A outputs an assumption $b' \in \{0, 1\}$. The output b' is the output of the experiment.

At this point, in the case where $$|Pr[Expt_A^{fss}(1^\lambda, 0) = 1] - Pr[Expt_A^{fss}(1^\lambda, 1) = 1]| \leq negl(\lambda)$$ [Formula 4]

is established for any attacker A, FSS is t-secure. In the case where $\delta \leq negl(\lambda)$ is satisfied, the FSS is simply written as (m, t)-FSS.

Correctness means that the value f(x) which is to be finally calculated is shared and calculated by $Eval(i, k_i, x)$ In addition, confidentiality means that, even when the subclass of keys is given to the attacker (i.e., even when part of $k_1, \ldots, k_m$ is given to the attacker), the attacker cannot obtain information on the function f.

Indistinguishability Obfuscator(IO)

An obfuscator is a technique for converting a program into a different program. The function of the post-conversion program is completely identical to the function of the pre-conversion program. In addition, the post-conversion program does not leak information on the pre-conversion program. In particular, an indistinguishability obfuscator is an obfuscator which guarantees that, in the case where two different programs having the same function are converted, it is not possible to determine which one of the programs is converted in order to obtain the post-conversion program. Note that, for details of the indistinguishability obfuscator, please refer to, e.g., Reference Document 3 and Reference Document 4 shown below.

[Reference Document 3] Boaz Barak, Oded Goldreich, Russell Impagliazzo, Steven Rudich, Amit Sahai, Salil P. Vadhan, and Ke Yang. On the (im)possibility of obfuscating programs. Journal of the ACM, 59(2):6, 2012.

[Reference Document 4] Sanjam Garg, Craig Gentry, Shai Halevi, Mariana Raykova, Amit Sahai, and Brent Waters. Candidate indistinguishability obfuscation and functional encryption for all circuits. SIAM J. Comput., 45(3):882-929, 2016.

That is, that a probabilistic polynomial time machine iO is the indistinguishability obfuscator for a circuit family $\{C_\lambda\}_{\lambda \in N}$ denotes that (2-1) correctness and (2-2) indistinguishability described below are satisfied. Herein, N represents the set of all natural numbers.

(2-1) Correctness: for any security parameter $\lambda \in N$, any $c \in C$, and any input x, $Pr[c'(x) = c(x) : c' \leftarrow iO(c)] = 1$ is satisfied.

(2-2) Indistinguishability: for any polynomial size distinguisher D in which a negligible function $\mu(\bullet)$ is present, any security parameter $\lambda \in N$, and any circuit pair having the same size $c_0, c_1 \in C_\lambda$ and any input x for which $c_0(x) = c_1(x)$ is established, the following formula is established:

$$|Pr[D(iO(c_0)) = 1] - Pr[D(iO(c_1)) = 1]| \leq \mu(\lambda)$$

This means that, if $c_0$ and $c_1$ are circuits having the same function, the attacker cannot determine whether the attacker has received obfuscation of $c_0$ or obfuscation of $c_1$.

Probabilistic Indistinguishability Obfuscator (PIO)

Next, consideration is given to obfuscation of a probabilistic circuit family $C := \{C_\lambda\}_{\lambda \in N}$. While the above-described obfuscator is for a deterministic circuit, a probabilistic indistinguishability obfuscator (PIO) is an obfuscator for a probabilistic circuit.

That a probabilistic polynomial time algorithm piO is the probabilistic indistinguishability obfuscator for the probabilistic circuit family $c:=\{C_\lambda\}_{\lambda\in N}$ denotes that (3-1) correctness and (3-2) indistinguishability described below are satisfied.

(3-1) Correctness: for any $\lambda \in N$, any $c \in C_\lambda$, any $c' \leftarrow piO$ (C), and any input x, the probability distribution of c(x) and the probability distribution of c'(x) are identical to each other. Note that, for details of the correctness, please refer to, e.g., Reference Document 5 shown below.

[Reference Document 5] Yevgeniy Dodis, Shai Halevi, Ron D. Rothblum, and Daniel Wichs. Spooky encryption and its applications. In Matthew Robshaw and Jonathan Katz, editors, CRYPTO 2016, Part III, volume 9816 of LNCS. pages 93-122. Springer, Heidelberg, August 2016.

(3-2) Indistinguishability: For any polynomial size distinguisher D in which a negligible function $\mu(\cdot)$ is present, any security parameter $\lambda \in N$, and any circuit pair having the same size $c_0$, $c_1 \in C_\lambda$ and any input x for which $c_0(x)=c_1(x)$ is established, the following formula is established:

$$|Pr[D(c_0,c_1,piO(c_0))=1]-Pr[D(c_0,c_1,piO(c_1))=1]|\leq \mu(\lambda)$$

Note that, as the definition of the correctness of (3-1) described above, the definition of Dodis et al. described in Reference Document 5 is used, but the definition of Canetti et al. described in Reference Document 6 shown below may also be used.

[Reference Document 6] Ran Canetti, Huijia Lin, Stefano Tessaro, and Vinod Vaikuntanathan. Obfuscation of probabilistic circuits and applications. In Dodis and Nielsen [DN15], pages 468-497.

In addition, also as the definition of the indistinguishability of (3-2) described above, the definition described in Reference Document 6 mentioned above may be used.

Herein, it is known that, if the indistinguishability obfuscator is present, the probabilistic indistinguishability obfuscator is present. In addition, if the indistinguishability obfuscator and a one-way function are present, the probabilistic indistinguishability obfuscator for the probabilistic circuit can be constituted.

For a specific implementation method of the indistinguishability obfuscator, please refer to, e.g., Reference Document 4 mentioned above, and Reference Document 7 and Reference Document 8 shown below. In addition, for a specific implementation method of the probabilistic indistinguishability obfuscator, please refer to, e.g., Reference Document 6 mentioned above.

[Reference Document 7] Boaz Barak, Sanjam Garg, Yael Tauman Kalai, Omer Paneth, and Amit Sahai. Protecting obfuscation against algebraic attacks. In Phong Q. Nguyen and Elisabeth Oswald, editors, EUROCRYPT 2014, volume 8441 of LNCS, pages 221-238. Springer, Heidelberg, May 2014.

[Reference Document 8] Sanjam Garg, Eric Miles, Pratyay Mukherjee, Amit Sahai, Akshayaram Srinivasan, and Mark Zhandry. Secure obfuscation in a weak multilinear map model. In Martin Hirt and Adam D. Smith, editors, TCC 2016-B, Part II, volume 9986 of LNCS, pages 241-268. Springer, Heidelberg, October/November 2016.

Outline of Present Invention

In each embodiment of the present invention, a description will be given of a ciphertext transformation system 1 which functions as universal ciphertext transformation (UCT) which transforms ciphertext of any public key encryption scheme into ciphertext of another public key encryption scheme. Hereinafter, the universal ciphertext transformation will be defined, and characteristics of the universal ciphertext transformation will be described. Note that the universal ciphertext transformation can be considered to be generalization of proxy re-encryption, and hence most terms in the following description are terms used in proxy re-encryption described in, e.g., each of NPLs 1 to 3.

Hereinafter, suppose that the total number of all of existing public key encryption schemes is denoted by K, and each public key encryption scheme is numbered with a number belonging to [K]. In addition, suppose that a key pair generated by the public key encryption scheme is numbered with a number belonging to [U] Herein, in the case where $$(pk_i,sk_i) \leftarrow \text{Gen}_{\sigma_i}(1^\lambda) \quad \text{[Formula 5]}$$

is described as Formula 5, the description means that the i-th key pair is generated by the public key encryption scheme.

$$\Sigma_{\sigma_i}=(\text{Gen}_{\sigma_i},\text{Enc}_{\sigma_i},\text{Dec}_{\sigma_i}) \quad \text{[Formula 6]}$$

Note that $\sigma_i \in [K]$ is satisfied. Note that Gen represents a key generation algorithm, Enc represents an encryption algorithm, and Dec represents a decryption algorithm.

Hereinafter, when it is emphasized that a given user is a delegator or a delegatee, the key pairs of the delegator and the delegatee are represented by $(pk_s, sk_s)$ and $(pk_d, sk_d)$ That is, ciphertext under $pk_s$ is transformed into ciphertext under $pk_d$. Herein, the delegator is a user who transforms ciphertext of a public key encryption scheme s into ciphertext of the public key encryption scheme s, and delegates decryption of the post-transformation ciphertext to the delegatee. On the other hand, the delegatee is a user who decrypts the ciphertext of the public key encryption scheme s.

Hereinafter, suppose that ciphertext space $C_{\sigma i}$ and message space $M_{\sigma i}$ are included in the description of $\Sigma_{\sigma i}$ (note that, to be precise, "i" of "$\sigma i$" is a subscript of "$\sigma$", i.e., "$\sigma_i$". The same applies to the following description.)

The universal ciphertext transformation is constituted by the following three algorithms (TrKeyGen, TrCT, TrDec).

TrKeyGen($1^\lambda$, $\Sigma_{\sigma s}$, $\Sigma_{\sigma d}$, $sk_s$, $pk_d$) receives a security parameter $1^\lambda$, a public key encryption scheme pair ($\Sigma_{\sigma s}$, $\Sigma_{\sigma d}$), a decryption key $sk_s$ of the public key encryption scheme $\Sigma_{\sigma s}$, and a public key $pk_d$ of the public key encryption scheme $\Sigma_{\sigma d}$, and outputs a transformation key $utk_{s \rightarrow d}$ for transforming ciphertext under $pk_s$ into ciphertext under $pk_d$. Hereinafter, the security parameter $1^\lambda$ is often omitted.

TrCT ($\Sigma_{\sigma s}$, $\Sigma_{\sigma d}$, $utk_{s \rightarrow d}$, $ct_s$) receives the public key encryption scheme pair ($\Sigma_{\sigma s}$, $\Sigma_{\sigma d}$), the transformation key $utk_{s \rightarrow d}$, and ciphertext $ct_s$ under the public key $pk_s$ of the public key encryption scheme $\Sigma_{\sigma s}$, and outputs transformed ciphertext tct.

TrDec($\Sigma_{\sigma d}$, $sk_d$, tct) receives the public key encryption scheme $\Sigma_{\sigma d}$, a decryption key $sk_d$ of the public key encryption scheme $\Sigma_{\sigma d}$, and the post-transformation ciphertext tct under the transformation key $utk_{s \rightarrow d}$, and outputs a message $m \in M_{\sigma s}$.

Note that, in, e.g., Example 1 described later or the like, the universal ciphertext transformation may not include TrDec. That is, two algorithms (TrKeyGen, TrCT) may constitute the universal ciphertext transformation.

Note that post-transformation ciphertext space $C_{\sigma s \rightarrow \sigma d}$ is potentially dependent on $C_{\sigma s}$ and $C_{\sigma d}$, and hence there can be cases where tct is not included in the ciphertext space $C_{\sigma d}$.

(Unidirectional Single-Hop UCT)

First, a description will be given of unidirectional single-hop universal ciphertext transformation (UCT) The unidirectional single-hop UCT is the universal ciphertext transformation in which ciphertext is transformed into another ciphertext only once and the ciphertext which has been transformed once cannot be transformed again.

The unidirectional single-hop UCT needs to have the following characteristics (unidirectional correctness) That is, in the unidirectional single-hop UCT, for any public key encryption scheme pair $(\Sigma_{os}, \Sigma_{od})$, key pairs $(pk_s, sk_s) \leftarrow Gen_{os}(1^{\lambda_s})$, $(pk_d, sk_d) \leftarrow Gen_{od}(1^{\lambda_d})$ (note that, to be precise, "i" of "$\lambda i$" (herein, i is s or d) is a subscript of "$\lambda$", i.e., "$\lambda_i$", The same applies to the following description), the message $m \in M_{os}$, and $ct_s \leftarrow Enc_{os}(pk_s, m)$, the following formula needs to be established:

$Pr[TrDec(\Sigma_{od}, sk_d, TrCT(\Sigma', TrKeyGen(\Sigma', sk_s, pk_d), ct_s)) = m] = 1$, where $\Sigma' := (\Sigma_{os}, \Sigma_{od})$ is satisfied.

(Bidirectional UCT)

Consideration can be given to bidirectional UCT. That is, the transformation key generated from the key pairs $(pk_s, sk_s)$ and $(pk_d, sk_d)$ can transform ciphertext under $pk_s$ into ciphertext which can be decrypted with $sk_d$, and transform ciphertext under $pk_d$ into ciphertext which can be decrypted with $sk_s$. However, the unidirectional UCT is more powerful than the bidirectional UCT. This is because the bidirectional UCT can be implemented by generating the transformation key $utk_{s \to d}$ and the transformation key $_{d \to s}$ with the unidirectional UCT.

(Unidirectional Multiple-Hop UCT)

Next, unidirectional multiple-hop UCT will be described. In the unidirectional multiple-hop UCT, the ciphertext tct transformed with the transformation key $utk_{s \to d}$ has the same format as that of the ciphertext under the public key $pk_d$, and ciphertext transformation can be applied a plurality of times. That is, for $tct \leftarrow TrCT(\Sigma_{os}, \Sigma_{od}, utk_{s \to d}, ct_s)$, $tct \in C_{o_d}^t$      [Formula 7]

is established. Note that t is an integer satisfying $t \geq 1$.

Herein, suppose that $L = L(\lambda)$ denotes the maximum number of hops which can be handled by the universal ciphertext transformation. At this point, the unidirectional multiple-hop UCT needs to have the following characteristics (L-hop correctness) That is, in the unidirectional multiple-hop UCT, for any public key encryption scheme pair $(\Sigma_{o0}, \Sigma_{o1}, \ldots, \Sigma_{oL})$, the key pair $(pk_i, sk_i) \leftarrow Gen_{oi}(1^{\lambda_i})$, $(i = 0, 1, \ldots, L)$, the message $m \in M_{o0}$, and ciphertext $ct_0 \leftarrow Enc_{o0}(pk_0, m)$, the following formula needs to be established:

$Pr[TrDec_j(sk_j, TrCT(\Sigma', TrKeyGen(\Sigma', sk_{j-1}, pk_j), ct_j)) = m] = 1$, where $j \in [1, L]$ is satisfied, and $\Sigma' := (\Sigma_{oj-1}, \Sigma_{oj})$      [Formula 8]

is satisfied.

Note that the security of the universal ciphertext transformation requires that, even when the transformation key is given to the attacker, the attacker cannot obtain information on plaintext from ciphertext.

First Embodiment

Hereinafter, a first embodiment of the present invention will be described. In each embodiment described below, for the sake of simplicity, $\Sigma_{oi} = (Gen_{oi}, Enc_{oi}, Dec_{oi})$ is also expressed as $\Sigma_i = (Gen_i, Enc_i, Dec_i)$. Note that, for example, in the case where $\Sigma_i$ is the public key encryption scheme of a given user i (e.g., a delegator), and $\Sigma_j$ is the public key encryption scheme of another user j (e.g., a delegatee), $\Sigma_i = \Sigma_j$ can be established. This is because, to be precise, $\Sigma_i$ and $\Sigma_j$ are $\Sigma_{oi}$ and $\Sigma_{oj}$, and the case where $o_i = o_j \varepsilon[K]$ is established can occur.

<Overall Configuration>

Figure 1:
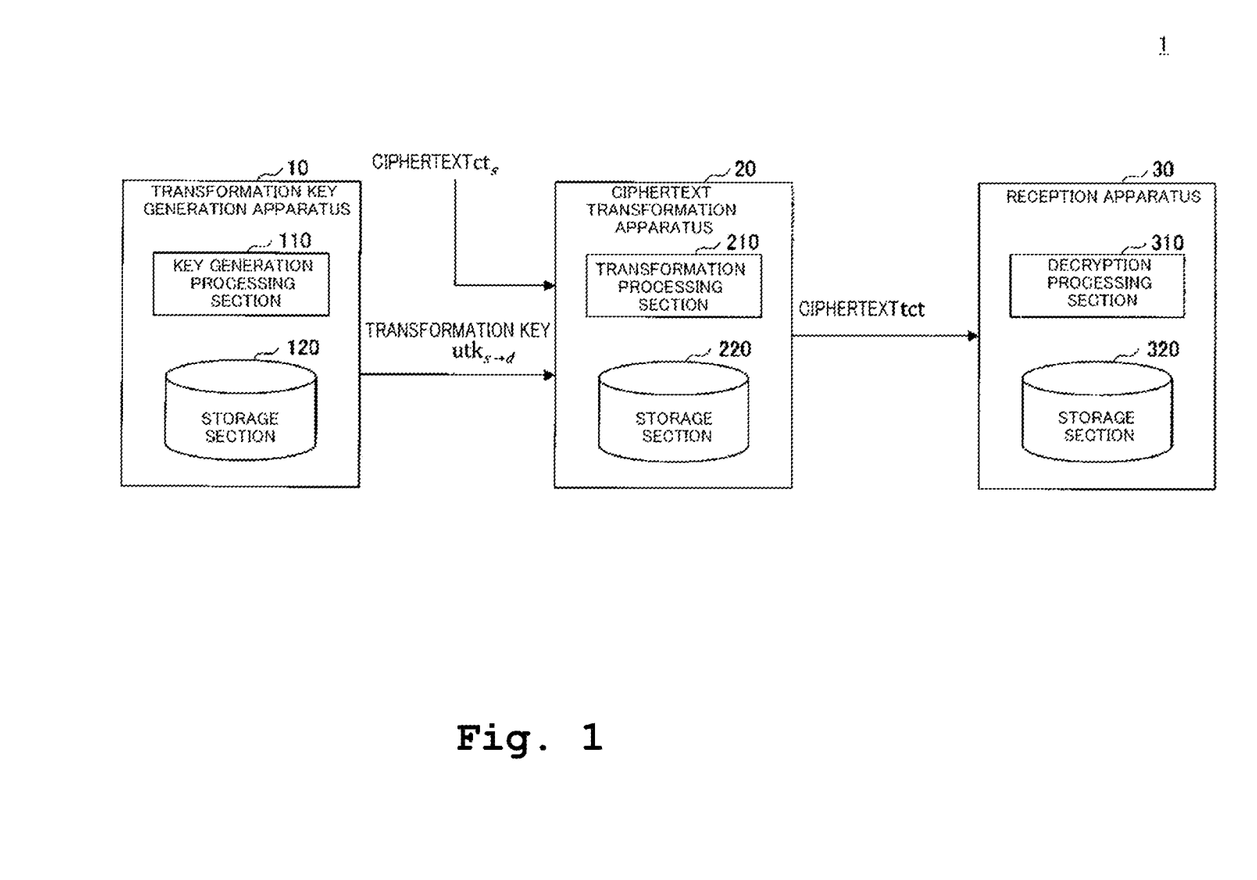
FIG. 1 is a view showing an example of the overall configuration of a ciphertext transformation system according to a first embodiment.

First, a description will be given of the overall configuration of the ciphertext transformation system 1 according to the present embodiment with reference to FIG. 1. FIG. 1 is a view showing an example of the overall configuration of the ciphertext transformation system 1 according to the first embodiment.

As shown in FIG. 1, the ciphertext transformation system 1 according to the present embodiment includes a transformation key generation apparatus 10, a ciphertext transformation apparatus 20, and a reception apparatus 30. Note that the transformation key generation apparatus 10, the ciphertext transformation apparatus 20, and the reception apparatus 30 are connected to each other via a communication network such as, e.g., the Internet so as to be able to communicate with each other.

The transformation key generation apparatus 10 is a computer or a computer system which generates a transformation key for transforming ciphertext by a public key of any public key encryption scheme into ciphertext by a public key of another public key encryption scheme. The transformation key generation apparatus 10 has a key generation processing section 110 and a storage section 120.

The key generation processing section 110 executes a TrKeyGen algorithm. That is, the key generation processing section 110 receives the security parameter $1^\lambda$, the public key encryption scheme pair $(\Sigma_s, \Sigma_d)$, the decryption key $sk_s$ of the transformation-source public key encryption scheme $\Sigma_s$, and the public key $pk_d$ of the post-transformation public key encryption scheme $\Sigma_d$, and outputs the transformation key $utk_{s \to d}$ for transforming ciphertext under the public key $pk_s$ into ciphertext under the public key $pk_d$. The transformation key $utk_{s \to d}$ is stored in, e.g., the storage section 120 and is also transmitted to the ciphertext transformation apparatus 20.

Note that the key generation processing section 110 is implemented by processing which a processor or the like is caused to execute by one or more programs installed in, e.g., the transformation key generation apparatus 10. In addition, the storage section 120 can be implemented by using, e.g., an auxiliary storage apparatus or the like.

The ciphertext transformation apparatus 20 is a computer or a computer system which transforms ciphertext by a public key of any public key encryption scheme into ciphertext by a public key of another public key encryption scheme. The ciphertext transformation apparatus 20 has a transformation processing section 210 and a storage section 220.

The transformation processing section 210 executes a TrCT algorithm. That is, the transformation processing section 210 receives the public key encryption scheme pair $(\Sigma_s, \Sigma_d)$, the transformation key $utk_{s \to d}$ generated in the transformation key generation apparatus 10, and the ciphertext $ct_s$ under the public key $pk_s$ of the public key encryption scheme $\Sigma_s$, and transforms the ciphertext $ct_s$ under the public key $pk_d$ into the ciphertext tct under the public key $pk_d$. The ciphertext tct is transmitted to the reception apparatus 30.

Herein, the transformation processing section 210 may receive the ciphertext $ct_s$ transmitted from the transformation key generation apparatus 10, may receive the ciphertext $ct_s$ transmitted from an apparatus different from the transformation key generation apparatus 10, or may receive the ciphertext $ct_s$ stored in the storage section 220.

Note that the transformation processing section 210 is implemented by processing which a processor or the like is caused to execute by one or more programs installed in, e.g., the ciphertext transformation apparatus 20. The storage section 220 can be implemented by using, e.g., an auxiliary storage apparatus or the like.

The reception apparatus 30 is a computer or a computer system which decrypts the post-transformation ciphertext. The reception apparatus 30 has a decryption processing section 310 and a storage section 320.

The decryption processing section 310 executes a TrDec algorithm. That is, the decryption processing section 310 receives the public key encryption scheme $\Sigma_d$, the decryption key $sk_d$ of the public key encryption scheme $\Sigma_d$, and the post-transformation ciphertext tct, and outputs the message m. The message m is stored in, e.g., the storage section 320.

Note that the decryption processing section 310 is implemented by processing which a processor or the like is caused to execute by one or more programs installed in, e.g., the reception apparatus 30. The storage section 320 can be implemented by using, e.g., an auxiliary storage apparatus or the like.

Note that the configuration of the ciphertext transformation system 1 shown in FIG. 1 is an example, and other configurations may also be adopted. For example, the transformation key generation apparatus 10 and the ciphertext transformation apparatus 20 may be integrally configured. Alternatively, for example, the ciphertext transformation apparatus 20 and the reception apparatus 30 may be integrally configured. Alternatively, for example, the transformation key generation apparatus 10 and the reception apparatus 30 may be integrally configured.

Overall Processing of Ciphertext Transformation System 1 According to First Embodiment (Example 1)

Figure 2:
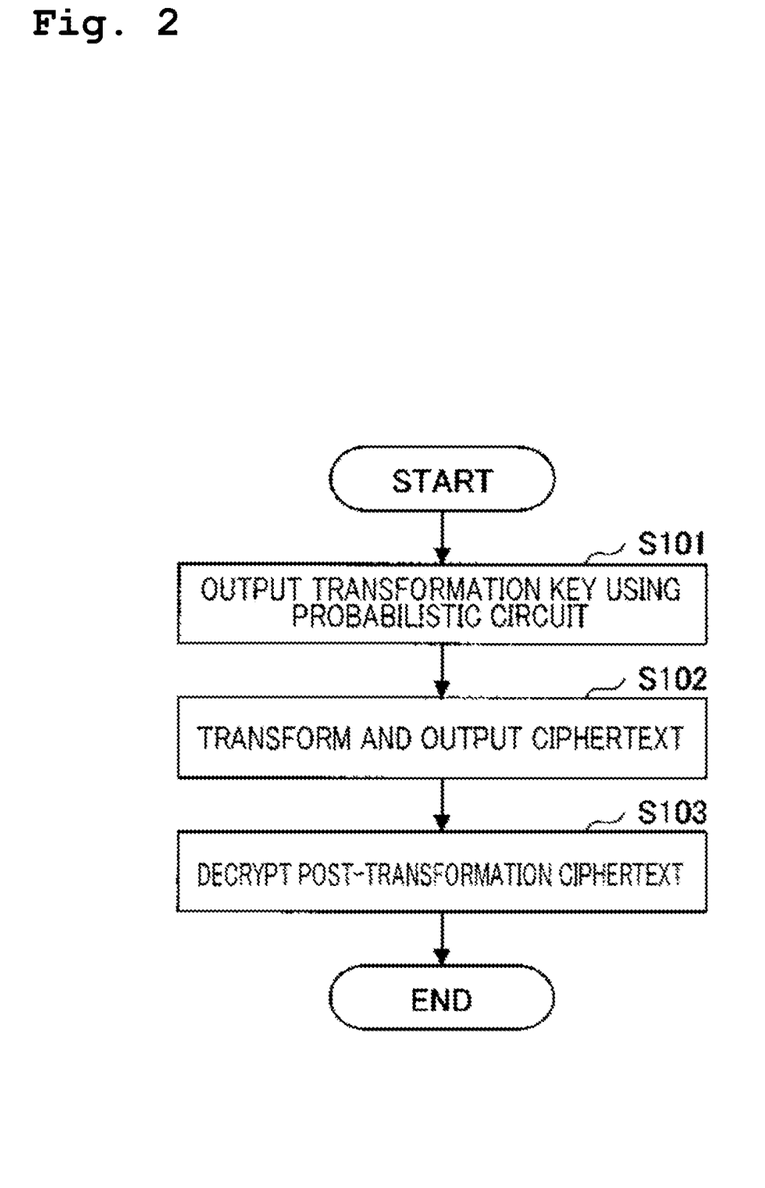
FIG. 2 is a flowchart (Example 1) showing an example of the overall processing of the ciphertext transformation system according to the first embodiment.

Hereinafter, as Example 1 of the overall processing of the ciphertext transformation system 1 according to the present embodiment, a description will be given of the overall processing in the case where the unidirectional single-hop universal ciphertext transformation is constituted by using the probabilistic indistinguishability obfuscator (PIO) with reference to FIG. 2. FIG. 2 is a flowchart (Example 1) showing an example of the overall processing of the ciphertext transformation system 1 according to the first embodiment. Note that, hereinafter, the unidirectional single-hop universal ciphertext transformation constituted by using the probabilistic indistinguishability obfuscator (PIO) is also written as $UCT_{pio}$.

Step S101: The key generation processing section 110 of the transformation key generation apparatus 10 receives the public key encryption scheme pair ($\Sigma_s$, $\Sigma_d$), the decryption key $sk_s$ of the transformation-source public key encryption scheme $\Sigma_s$, and the public key $pk_d$ of the post-transformation public key encryption scheme $\Sigma_d$, and outputs the transformation key $utk_{s \to d}$ by Step S101-1 to Step S101-2 shown below.

Step S101-1: First, the key generation processing section 110 defines (describes) a probabilistic circuit $T_{pio}$ in the following manner. Accordingly, the probabilistic circuit $T_{pio}$ is also written as $T_{pio}[\Sigma_s, \Sigma_d, sk_s, pk_d]$.

Values directly written in the probabilistic circuit $T_{pio}$: $\Sigma_s$, $\Sigma_d$, $sk_s$, $pk_d$ Input to the probabilistic circuit $T_{pio}$: $ct_s \in C_s$ Processing of the probabilistic circuit $T_{pio}$: (1) $m \leftarrow Dec_s(sk_s, ct_s)$ is calculated. (2) $ct_d \leftarrow Enc_d(pk_d, m)$ is generated and output.

Step S101-2: Next, the key generation processing section 110 outputs $utk_{s \to d}:=piO(T_{pio})$ as the transformation key.

That is, the transformation key $utk_{s \to d}$ is obtained by obfuscating the probabilistic circuit $T_{pio}$ with the PIO.

With this, the transformation key $utk_{s \to d}$ is generated by the transformation key generation apparatus 10. This transformation key $utk_{s \to d}$ is stored in, e.g., the storage section 120 and is also transmitted to the ciphertext transformation apparatus 20.

Step S102: The transformation processing section 210 of the ciphertext transformation apparatus 20 receives the public key encryption scheme pair ($\Sigma_s$, $\Sigma_d$), the transformation key $utk_{s \to d}$ generated in the transformation key generation apparatus 10, and the ciphertext $ct_s$ under the public key $pk_s$ of the public key encryption scheme $\Sigma_s$, and transforms the ciphertext $ct_s$ into the ciphertext tct by Step S102-1 to Step S102-2 shown below.

Step S102-1: First, the transformation processing section 210 parses the transformation key into $utk_{s \to d} = piO(T_{pio})$.

Step S102-2: Next, the transformation processing section 210 calculates tct:=$piO(T_{pio})(ct_s)$, and outputs the calculation result as the post-transformation ciphertext.

With this, the ciphertext $ct_s$ is transformed into the ciphertext tct by the ciphertext transformation apparatus 20. The post-transformation ciphertext tct is transmitted to, e.g., the reception apparatus 30.

Step S103: The decryption processing section 310 of the reception apparatus 30 receives the public key encryption scheme $\Sigma_d$, the decryption key $sk_d$ of the public key encryption scheme $\Sigma_d$, and the post-transformation ciphertext tct, and outputs the message m by Step S103-1 to Step S103-2 shown below.

Step S103-1: First, the decryption processing section 310 parses tct=$ct_d'$.

Step S103-2: Next, the decryption processing section 310 calculates m'$\leftarrow Dec_d(sk_d, ct_d')$, and outputs the calculation result as a decrypted message.

With this, the decrypted message m' is obtained by the reception apparatus 30. Herein, a description will be given of correctness of the message m' in Example 1. According to the definition of the probabilistic circuit $T_{pio}$, for $ct_s \leftarrow Enc_s(pk_s, m)$, $T_{pio}(ct_s) = Enc_d(pk_d, m) = ct_d$ is established. Consequently, with the correctness of the probabilistic indistinguishability obfuscator piO and the correctness of $\Sigma_s$, tct=$piO(T_{pio})(ct_s) = ct_d$ is established. Accordingly, with the correctness of $\Sigma_d$, m=m'=$Dec_d(sk_d, ct_d')$ is established. That is, for any $j \in [L]$ (s=0 and $tct_0 = ct_s$ are considered to be satisfied), the following formula is established:

$$TrDec(\Sigma_j, sk_j, TrCT(\Sigma', TrKeyGen(\Sigma', sk_{j-1}, pk_j), tct_{j-1})) = Dec_{j-1}(sk_{j-1}, tct_{j-1})$$

where $\Sigma' = (\Sigma_{j-1}, \Sigma_{j-1})$ is satisfied.

In view of the foregoing, if the public key encryption scheme $\Sigma_i$ is secure, and the piO is the indistinguishability obfuscation of the secure probabilistic circuit, the $UCT_{pio}$ is the secure unidirectional multiple-hop universal ciphertext transformation for the public key encryption scheme.

Overall Processing of Ciphertext Transformation System 1 According to First Embodiment (Example 2)

Figure 3:
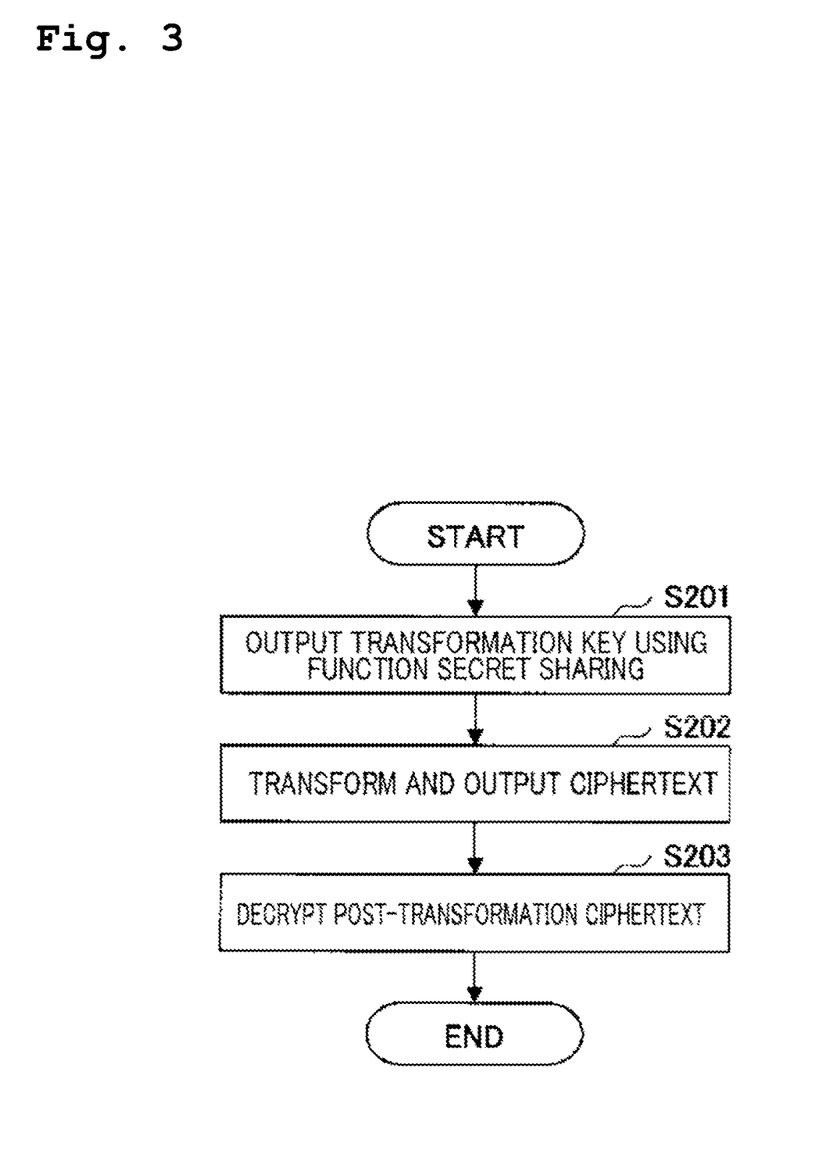
FIG. 3 is a flowchart (Example 2) showing an example of the overall processing of the ciphertext transformation system according to the first embodiment.

Hereinafter, as Example 2 of the overall processing of the ciphertext transformation system 1 according to the present embodiment, a description will be given of the overall processing in the case where the unidirectional multiple-hop universal ciphertext transformation is constituted by using the function secret sharing (FSS) with reference to FIG. 3. FIG. 3 is a flowchart (Example 2) showing an example of the overall processing of the ciphertext transformation system 1 according to the first embodiment. Herein, suppose that the function secret sharing constituting the unidirectional multiple-hop universal ciphertext transformation is two-party function secret sharing (i.e., FSS=(FSS. Gen, FSS. Eval)). Note that, hereinafter, the unidirectional multiple-hop universal ciphertext transformation constituted by using the function secret sharing is also written as $UCT_{fss}$.

Step S201: The key generation processing section 110 of the transformation key generation apparatus 10 receives the public key encryption scheme pair $(\Sigma_s, \Sigma_d)$, the decryption key $sk_s$ of the transformation-source public key encryption scheme $\Sigma_s$, and the public key $pk_d$ of the post-transformation public key encryption scheme $\Sigma_d$, and outputs the transformation key $utk_{s \to d}$ by Step S201-1 to Step S201~3 shown below.

Step S201-1: First, the key generation processing section 110 defines (describes) a function $T_{fss}$ in the following manner. Accordingly, the function $T_{fss}$ is also written as $T_{fss}[\Sigma_s, sk_s]$.

Values directly written in the function $T_{fss}$: $\Sigma_s$, $sk_s$

Input to the function $T_{fss}$: the ciphertext $ct_s \in C_s$ processing of the function $T_{fss}$: $m \leftarrow Dec_s(sk_s, ct_s)$ is calculated and output.

Step S201-2: Next, the key generation processing section 110 generates the key of the function secret sharing $(k_1, k_2) \leftarrow FSS$. Gen $(1^\lambda, T_{fss}[\Sigma_s, sk_s])$ and ciphertext of $k_2$.

[Formula 9]

$$\widetilde{ct}_d \leftarrow Enc_d(pk_d, k_2)$$

Hereinafter, for the convenience of text of the description, the ciphertext of $k_2$ is also written as "$ct_d\!\sim$".

Step S201-3: Next, the key generation processing section 110 outputs $utk_{s \to d} = (k_1, ct_d\!\sim)$ as the transformation key.

With this, the transformation key $utk_{s \to d}$ is generated by the transformation key generation apparatus 10. This transformation key $utk_{s \to d}$ is stored in, e.g., the storage section 120 and is also transmitted to the ciphertext transformation apparatus 20.

Step S202: The transformation processing section 210 of the ciphertext transformation apparatus 20 receives the public key encryption scheme pair $(\Sigma_s, \Sigma_d)$, the transformation key $utk_{s \to d}$ generated in the transformation key generation apparatus 10, and the ciphertext $ct_s$ under the public key $pk_s$ of the public key encryption scheme $\Sigma_s$, and transforms the ciphertext $ct_s$ into the ciphertext tct by Step S202-1 to Step S202-3 shown below.

Step S202-1: First, the transformation processing section 210 parses the transformation key into $utk_{s \to d} = (k_1, ct_d\!\sim)$.

Step S202-2: Next, the transformation processing section 210 calculates $y_1 \leftarrow FSS$. Eval $(1, k_1, ct_s)$.

Step S202-3: Next, the transformation processing section 210 outputs the post-transformation ciphertext as $tct := (ct_s, y_1, ct_d\!\sim)$.

With this, the ciphertext $ct_s$ is transformed into the ciphertext tct by the ciphertext transformation apparatus 20. The post-transformation ciphertext tct is transmitted to, e.g., the reception apparatus 30.

Step S203: The decryption processing section 310 of the reception apparatus 30 receives the public key encryption scheme $\Sigma_d$, the decryption key $sk_d$ of the public key encryption scheme $\Sigma_d$, and the post-transformation ciphertext tct, and outputs the message m by Step S203-1 to Step S203-3 shown below.

Step S203-1: First, the decryption processing section 310 parses the post-transformation ciphertext into $tct = (ct_s, y_1, ct_d\!\sim)$.

Step S203-2: Next, the decryption processing section 310 calculates $k_2' \leftarrow Dec_d(sk_d, ct_d\!\sim)$ and $y_2 \leftarrow FSS$. Eval $(2, k_2', ct_s)$.

Step S203-3: Next, the decryption processing section 310 outputs m': $= y_1 + y_2$ as the decrypted message. Herein, a description will be given of correctness of the message m' in Example 2. With the correctness of the public key encryption scheme $\Sigma_d$, $k_2 = k_2' \leftarrow Dec_d(sk_d, ct_d\!\sim)$ is established. This is because $ct_d\!\sim \leftarrow Enc_d(pk_d, k_2)$ is established. In addition, for $(k_1, k_2) \leftarrow FSS$. Gen$(1^\lambda, T_{fss}[\Sigma_s, sk_s])$, with the correctness of (2, 1)-δ-FSS, the following formula is established:

$$T_{fss}[\Sigma_s, sk_s](ct_s) = FSS.Eval(1, k_1, ct_s) + FSS.Eval(2, k_2, ct_s) = y_1 + y_2$$

Further, with the definition of the function $T_{fss}$, for $ct_s \leftarrow Enc_s(pk_s, m)$, $T_{fss}[\Sigma_s, sk_s](ct_s) = m$ is established. Consequently, m=m' is satisfied.

In view of the foregoing, if the public key encryption scheme $\Sigma_i$ is secure and the FSS is secure (2, 1)-δ-FSS for any circuit, the $UCT_{fss}$ is the secure unidirectional single-hop universal ciphertext transformation for the public key encryption scheme.

Note that the secure (2, 1)-δ-FSS for any circuit can be implemented by using LWE (Learning With Error) assumption or indistinguishability obfuscation. For details thereof, please refer to, e.g., Reference Document 1 or Reference Document 5 mentioned above.

Extension of Example 2

The $UCT_{fss}$ described in above Example 2 can be extended to a specific-number-of-times multiple-hop UCT. The specific number denotes a specific number which does not depend on a security parameter. While the transformation processing section 210 outputs $tct = (ct_s, y_1, ct_d\!\sim)$ in Example 2 described above, instead, the transformation processing section 210 outputs

[Formula 10]

$$tct = (\widehat{ct}_d, \widetilde{ct}_d)$$

as the post-transformation ciphertext. Herein,

[Formula 11]

$$\widehat{ct}_d \leftarrow Enc_d(pk_d, (ct_s, y_2))$$

is established.

Therefore, $tct \in C_d^2$ is established, and the tct can be transformed again for another user d' by using a transformation key $utc_{d \to d'}$.

In addition, the TrDec algorithm executed by the decryption processing section 310 is corrected in the following manner. That is, the decryption processing section 310 of the reception apparatus 30 of the user d' can obtain $(ct_s, y_1, k_2)$ by using a decryption key $sk_{d'}$. Note that $k_2$ is a key of the function secret sharing (FSS) generated by FSS. Gen($T_{fss}[\Sigma_s, sk_s]$). Next, the decryption processing section 310 can obtain m=FSS. Eval(1, $k_1$, $ct_s$)+FSS. Eval(2, $k_2$, $ct_s$).

In the above description, the case of two hop is described but, similarly, it is possible to implement the case of L-times hop. Note that, in this method, the length of the ciphertext increases according to a given polynomial every time the transformation of the ciphertext is repeated, and hence the transformation can be applied only a specific number of times.

In view of the foregoing, also in the extension of Example 2, similarly to Example 2, if the public key encryption scheme $\Sigma_i$ is secure and the FSS is the secure (2, 1)-δ-FSS for any circuit, the $UCT_{fss}$ is the secure unidirectional single-hop universal ciphertext transformation for the public key encryption scheme.

Second Embodiment

Hereinafter, a second embodiment of the present invention will be described.

<Overall Configuration>

Figure 4:
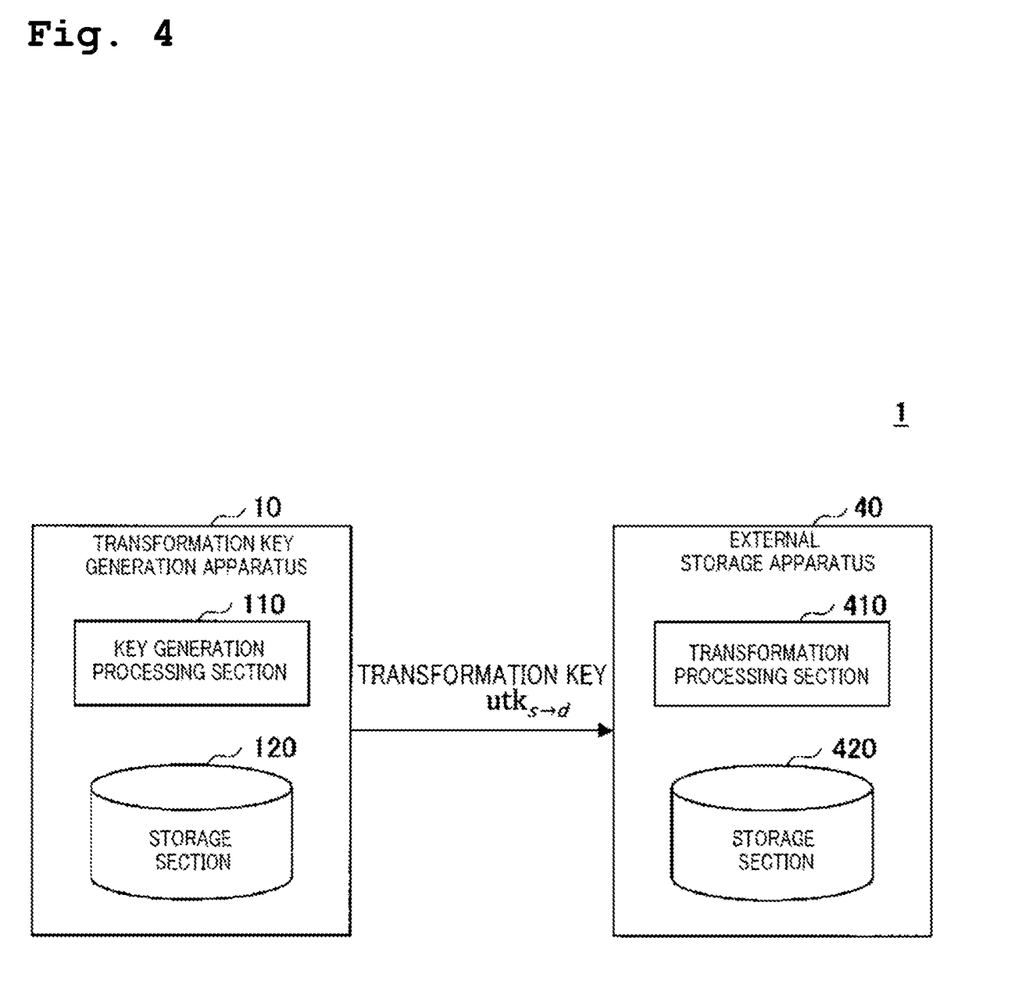
FIG. 4 is a view showing an example of the overall configuration of the ciphertext transformation system according to a second embodiment.

Hereinafter, a description will be given of the overall configuration of the ciphertext transformation system 1 according to the present embodiment with reference to FIG. 4. FIG. 4 is a view showing an example of the overall configuration of the ciphertext transformation system 1 according to the second embodiment.

As shown in FIG. 4, the ciphertext transformation system 1 according to the present embodiment includes the transformation key generation apparatus 10, and an external storage apparatus 40. The transformation key generation apparatus 10 and the external storage apparatus 40 are connected to each other via a communication network such as, e.g., the Internet so as to be able to communicate with each other.

Similarly to the first embodiment, the transformation key generation apparatus 10 is a computer or a computer system which generates the transformation key. In addition, the key generation processing section 110 and the storage section 120 of the transformation key generation apparatus 10 are the same as those in the first embodiment.

The external storage apparatus 40 stores ciphertext by a public key of any public key encryption scheme, and is a computer or a computer system which transforms the above ciphertext into ciphertext by a public key of another public key encryption scheme. The external storage apparatus 40 is, e.g., a cloud storage server or the like which stores the ciphertext by the public key of any public key encryption scheme. The external storage apparatus 40 has a transformation processing section 410 and a storage section 420.

The transformation processing section 410 executes the TrCT algorithm. That is, the transformation processing section 210 receives the public key encryption scheme pair $(\Sigma_s, \Sigma_d)$, the transformation key $utk_{s \to d}$ generated in the transformation key generation apparatus 10, and the ciphertext $ct_s$ under the public key $pk_s$ of the public key encryption scheme $\Sigma_s$, and transforms the ciphertext $ct_s$ under the public key $pk_s$ into the ciphertext tct under the public key $pk_d$. Herein, the transformation processing section 410 receives the ciphertext $ct_s$ stored in the storage section 420, and transforms the ciphertext $ct_s$ into tct. Subsequently, the transformation processing section 410 stores the post-transformation ciphertext tct in the storage section 420.

Thus, in the ciphertext transformation system 1 according to the second embodiment, the ciphertext $ct_s$ stored in the external storage apparatus 40 is transformed into the ciphertext tct under the public key of another public key encryption scheme. With this, for example, in the case where a large amount of ciphertext which is encrypted according to a given public key encryption scheme $\Sigma_s$ is retained in the external storage apparatus 40, the large amount of ciphertext can be transformed into ciphertext of another public key encryption scheme $\Sigma_d$ on the external storage apparatus 40.

Moreover, at this point, in the ciphertext transformation system 1 according to the present embodiment, it is possible to perform the transformation of ciphertext without giving the decryption key $sk_s$ of the public key encryption scheme $\Sigma_s$ to the external storage apparatus 40. Accordingly, for example, in the case where vulnerability is found in the public key encryption scheme $\Sigma_s$ or the case where the security parameter used in the generation of the public key $pk_s$ becomes obsolete and cannot guarantee sufficient security, it becomes possible to easily perform transition to another public key encryption scheme (e.g., the latest public key encryption scheme or the like) and transition to the public key generated by using a longer security parameter with the external storage apparatus 40.

According to Second Embodiment

Figure 5:
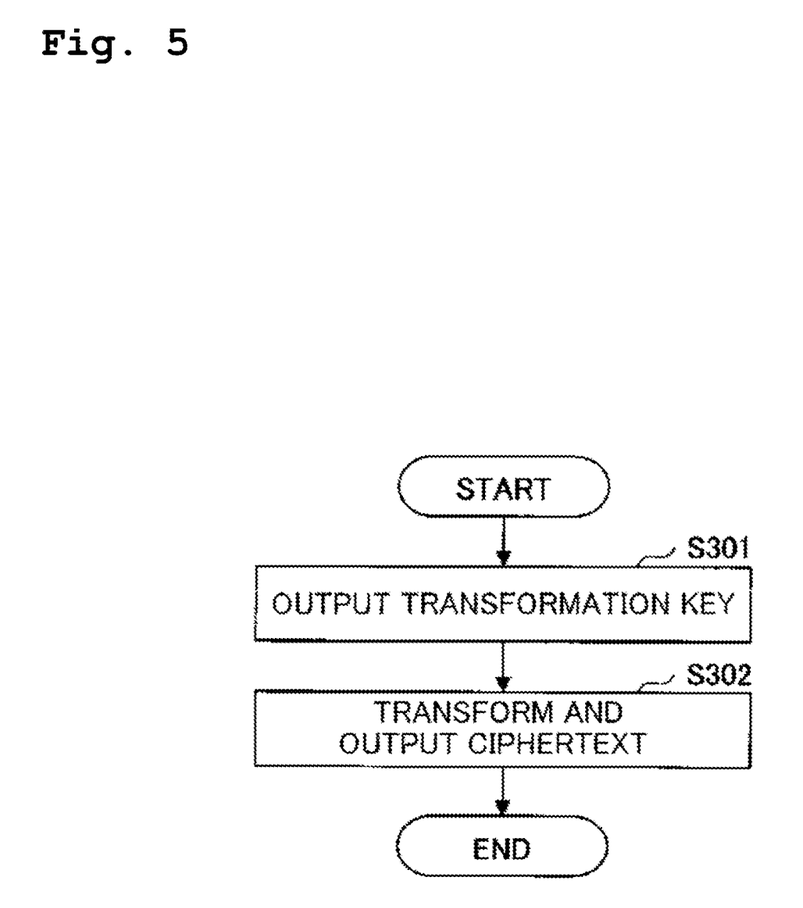
FIG. 5 is a flowchart showing an example of the overall processing of the ciphertext transformation system according to the second embodiment.

Hereinafter, a description will be given of the overall processing of the ciphertext transformation system 1 according to the present embodiment with reference to FIG. 5. FIG. 5 is a flowchart showing an example of the overall processing of the ciphertext transformation system 1 according to the second embodiment.

Step S301: The key generation processing section 110 of the transformation key generation apparatus 10 generates the transformation key $utk_{s \to d}$ by the same method as that in the first embodiment, and outputs (transmits) the transformation key $utk_{s \to d}$ to the external storage apparatus 40.

Step S302: The transformation processing section 410 of the external storage apparatus 40 receives the public key encryption scheme pair $(\Sigma_s, \Sigma_d)$, the transformation key $utk_{s \to d}$ generated in the transformation key generation apparatus 10, and the ciphertext $ct_s$ under the public key $pk_s$ of the public key encryption scheme $\Sigma_s$, and transforms the ciphertext $ct_s$ into the ciphertext tct by the same method as that in the first embodiment. Subsequently, the transformation processing section 410 outputs (retains) the post-transformation ciphertext tct to (in) the storage section 420. Note that the transformation processing section 410 receives the ciphertext $ct_s$ from the storage section 420.

With this, the ciphertext $ct_s$ stored in the storage section 420 is transformed into the ciphertext tct by the external storage apparatus 40.

<Hardware Configuration>

Figure 6:
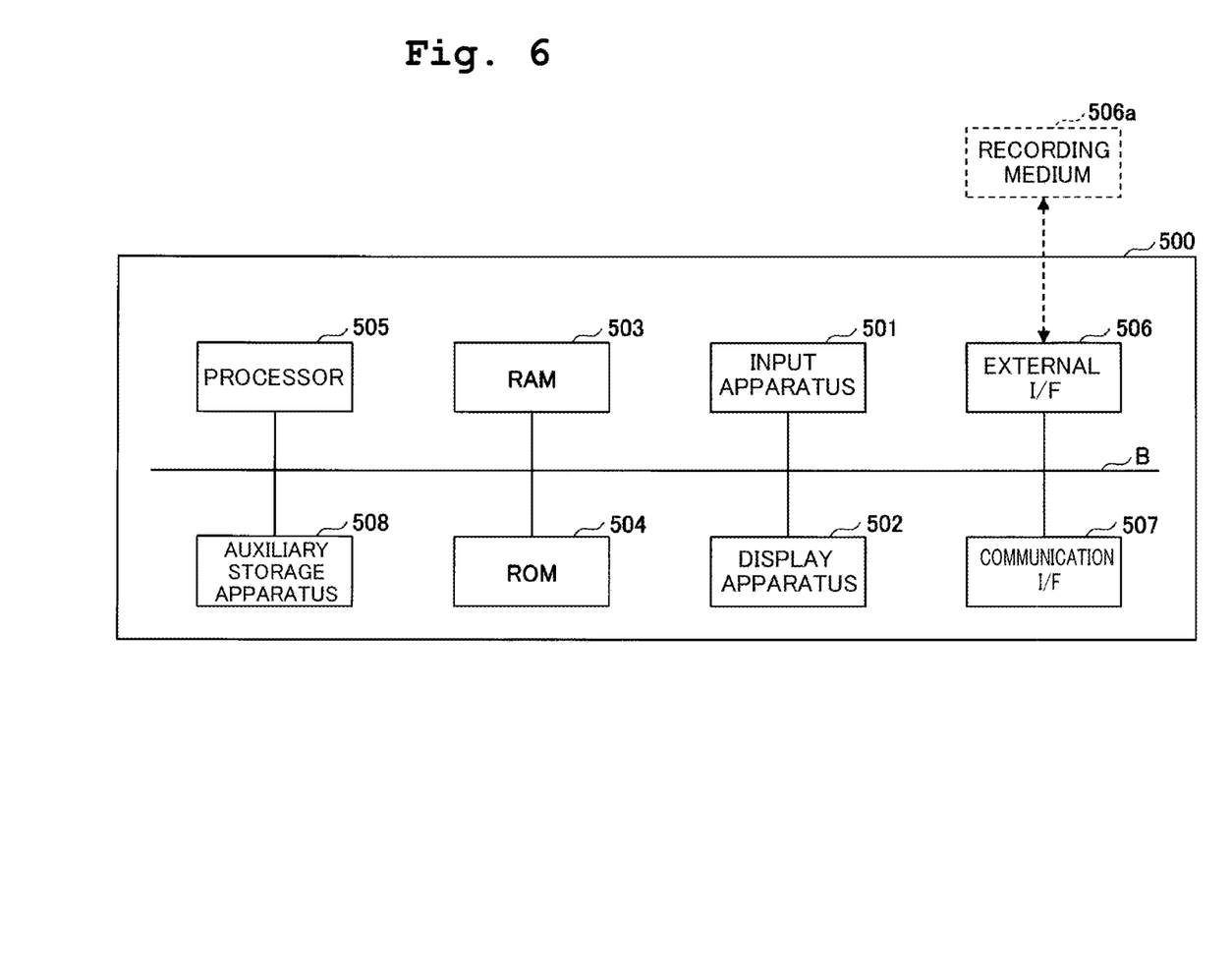
FIG. 6 is a view showing an example of the hardware configuration of a computer.

Lastly, a description will be given of the hardware configuration of each of the transformation key generation apparatus 10, the ciphertext transformation apparatus 20, the reception apparatus 30, and the external storage apparatus 40 described in each embodiment described above. These apparatuses can be implemented by the same hardware configuration as that of a computer 500 shown in, e.g., FIG. 6. FIG. 6 is a view showing an example of the hardware configuration of the computer 500.

The computer 500 shown in FIG. 5 has an input apparatus 501, a display apparatus 502, a RAM (Random Access Memory) 503, a ROM (Read Only Memory) 504, a processor 505, an external I/F 506, a communication I/F 507, and an auxiliary storage apparatus 508. These pieces of hardware are connected to each other via a bus 509 so as to be able to communicate with each other.

The input apparatus 501 is, e.g., a keyboard, a mouse, or a touch panel, and is used to input various operations by a user. The display apparatus 502 is, e.g., a display or the like, and is used to display processing results or the like to the user. Note that the computer 500 may not have at least one of the input apparatus 501 and the display apparatus 502.

The RAM 503 is a volatile semiconductor memory which temporarily retains programs and data. The ROM 504 is a non-volatile semiconductor memory which can retain programs and data even when the power is turned off. The processor 505 is, e.g., a CPU (Central Processing Unit) or the like, and is an operation apparatus which reads programs and data into the RAM 503 from the ROM 504 and the auxiliary storage apparatus 508 and executes processing.

The external I/F 506 is an interface with an external apparatus. The external apparatus includes a recording medium 506a or the like. Examples of the recording medium 506a include a CD (Compact Disc), a DVD (Digital Versatile Disk), an SD memory card (Secure Digital memory card), and a USB (Universal Serial Bus) memory card.

The communication I/F 507 is an interface for connecting the computer 500 to a communication network. The computer 500 can perform data communication with other apparatuses via the communication I/F 507.

The auxiliary storage apparatus 508 is a non-volatile storage apparatus such as, e.g., an HDD (Hard Disk Drive) or an SSD (Solid State Drive) In the auxiliary storage apparatus 508, various data and programs are stored.

Each of the transformation key generation apparatus 10, the ciphertext transformation apparatus 20, the reception apparatus 30, and the external storage apparatus 40 described in each embodiment of the present invention can implement various processing described above by having, e.g., the hardware configuration of the computer 500 shown in FIG. 6. Note that each of the transformation key generation apparatus 10, the ciphertext transformation apparatus 20, the reception apparatus 30, and the external storage apparatus 40 described in each embodiment of the present invention may have, e.g., the hardware configurations of a plurality of the computers 500.

The present invention is not limited to each embodiment described above which is specifically disclosed, and various modifications, changes, and combinations can be made to the present invention without departing from the scope of claims.

REFERENCE SIGNS LIST

1 Ciphertext transformation system
10 Transformation key generation apparatus
20 Ciphertext transformation apparatus
30 Reception apparatus
40 External storage apparatus
110 Key generation processing section
120 Storage section
210 Transformation processing section
220 Storage section
310 Decryption processing section
320 Storage section
410 Transformation processing section
420 Storage section

The invention claimed is:

1. A transformation key generation apparatus comprising:
a processor; and
a memory storing program instructions that cause the processor to receive a decryption key of a first public key encryption scheme and a public key of a second public key encryption scheme, and generate a transformation key for transforming first ciphertext of the first public key encryption scheme into second ciphertext of the second public key encryption scheme, the transformation key being generated by converting a probabilistic circuit by using a probabilistic indistinguishability obfuscator or being generated by converting a function secret sharing key $(k_1, k_2)$ to $(k_1, ct_{d^\sim})$, wherein the decryption key of the first public key encryption scheme and the public key of the second public key encryption scheme are directly written in the probabilistic circuit, and the probabilistic circuit calculates $m \leftarrow Dec_s(sk_s, ct_s)$ and $ct_d \leftarrow Enc_d(pk_d, m)$ to output $ct_d$ being the second cipher text, and wherein the function secret sharing key $(k_1, k_2)$ is generated by using an algorithm of two-party function secret sharing and $ct_{d^\sim}$ is a ciphertext obtained by transforming $k_2$ by using the public key of the second public key encryption scheme.

2. A transformation key generation method for causing a computer to execute:

receiving a decryption key of a first public key encryption scheme and a public key of a second public key encryption scheme; and generating a transformation key for transforming first ciphertext of the first public key encryption scheme into second ciphertext of the second public key encryption scheme by using a probabilistic circuit or function secret sharing, the transformation key being generated by converting a probabilistic circuit by using a probabilistic indistinguishability obfuscator or being generated by converting a function secret sharing key $(k_1, k_2)$ to $(k_1, ct_{d^\sim})$, wherein the decryption key of the first public key encryption scheme and the public key of the second public key encryption scheme are directly written in the probabilistic circuit, and the probabilistic circuit calculates $m \leftarrow Dec_s(sk_s, ct_s)$ and $ct_d \leftarrow Enc_d(pk_d, m)$ to output $ct_d$ being the second cipher text, and wherein the function secret sharing key $(k_1, k_2)$ is generated by using an algorithm of two-party function secret sharing and $ct_{d^\sim}$ is a ciphertext obtained by transforming $k_2$ by using the public key of the second public key encryption scheme.

3. A non-transitory computer-readable recording medium having stored therein program instructions for causing a processor to execute:

receiving a decryption key of a first public key encryption scheme and a public key of a second public key encryption scheme; and generating a transformation key for transforming first ciphertext of the first public key encryption scheme into second ciphertext of the second public key encryption scheme by using a probabilistic circuit or function secret sharing, the transformation key being generated by converting a probabilistic circuit by using a probabilistic indistinguishability obfuscator or being generated by converting a function secret sharing key $(k_1, k_2)$ to $(k_1, ct_{d^\sim})$, wherein the decryption key of the first public key encryption scheme and the public key of the second public key encryption scheme are directly written in the probabilistic circuit, and the probabilistic circuit calculates $m \leftarrow Dec_s(sk_s, ct_s)$ and $ct_d \leftarrow Enc_d(pk_d, m)$ to output $ct_d$ being the second cipher text, and wherein the function secret sharing key $(k_1, k_2)$ is generated by using an algorithm of two-party function secret sharing and $ct_{d^\sim}$ is a ciphertext obtained by transforming $k_2$ by using the public key of the second public key encryption scheme.

4. The transformation key generation apparatus according to claim 1, wherein the program instructions further cause the processor to:
   transform the first ciphertext into the second cipher text with the generated transformation key;
   decrypt the transformed second cipher text.

\* \* \* \* \*